United States Patent [19]

Deambrosio

[11] Patent Number: 5,069,380

[45] Date of Patent: Dec. 3, 1991

[54] INERTED IR SOLDERING SYSTEM

[76] Inventor: Carlos Deambrosio, 1 Place de Guise, Apt. 12, Candiac, Canada

[21] Appl. No.: 537,424

[22] Filed: Jun. 13, 1990

[51] Int. Cl.$^5$ .......................... B23K 3/00; B23K 1/008
[52] U.S. Cl. ........................................ 228/42; 228/43; 228/219; 219/388
[58] Field of Search ................. 228/42, 43, 219, 180.1, 228/242; 219/388, 395, 399, 405

[56] References Cited

U.S. PATENT DOCUMENTS

| | | | |
|---|---|---|---|
| 3,882,596 | 5/1975 | Kendziora et al. | 228/219 |
| 4,832,249 | 5/1989 | Ehler | 228/219 |
| 4,876,437 | 10/1989 | Kondo | 219/388 |
| 4,909,430 | 3/1990 | Yokota | 219/388 |
| 4,938,410 | 7/1990 | Kondo | 219/388 |

Primary Examiner—Samuel M. Heinrich
Attorney, Agent, or Firm—Darby & Darby

[57] ABSTRACT

An infrared soldering machine has an inert gas atmosphere to prevent oxidation of the solder. Heaters positioned within the machine housing above a conveyor has through apertures and fans direct inert gas down through the heaters onto the conveyor. The forced convection assists in maintaining uniform temperature across the conveyor. In order to prevent leakage of ambient air into the housing where the fan shafts protrude for connection to electric motors, a gas seal is provided at each fan shaft. The seal extends between two spaced bearings rotatably securing the fan shaft. Each electric motor is mounted away from the heat of the machine and is connected to the respective fan shaft by means of a belt drive.

10 Claims, 5 Drawing Sheets

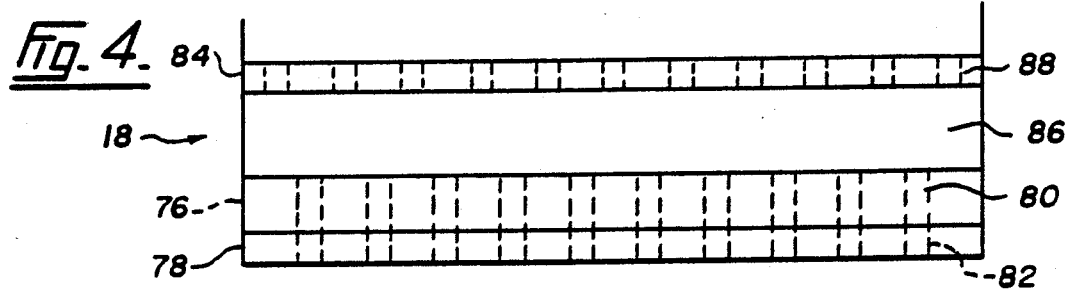
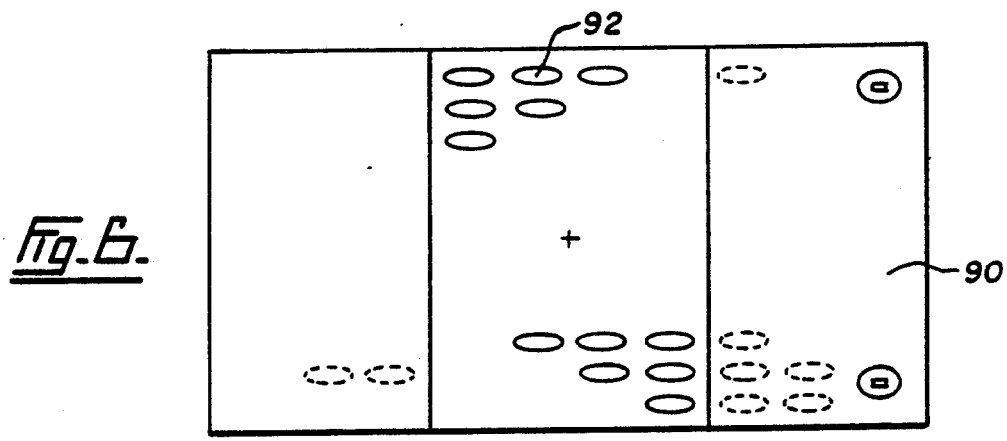
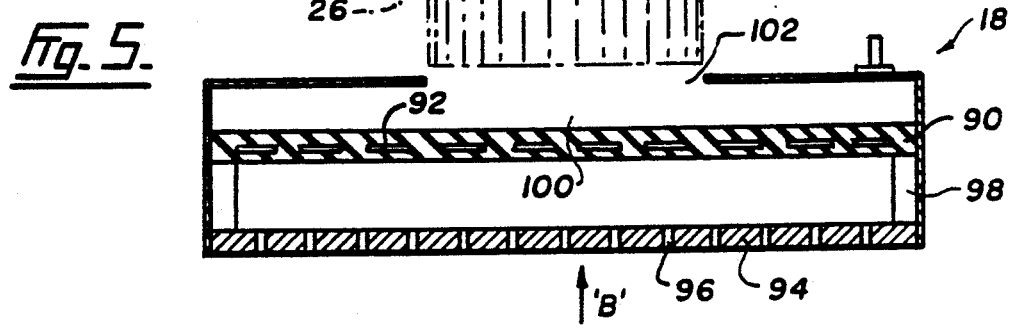
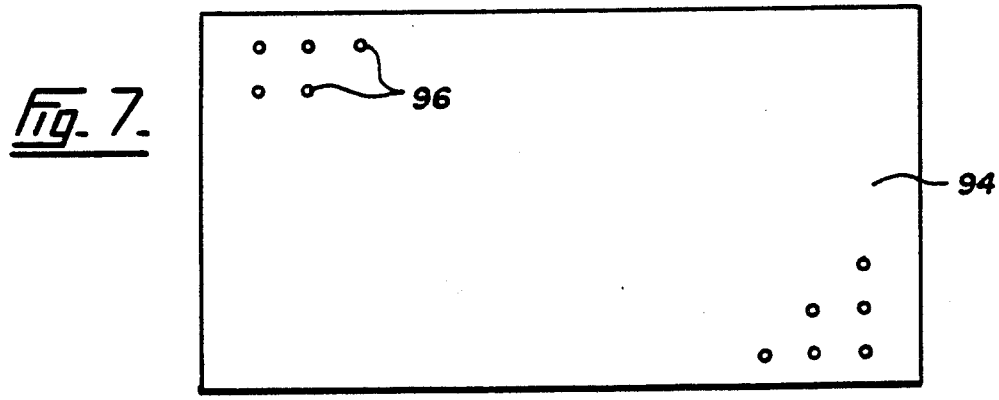

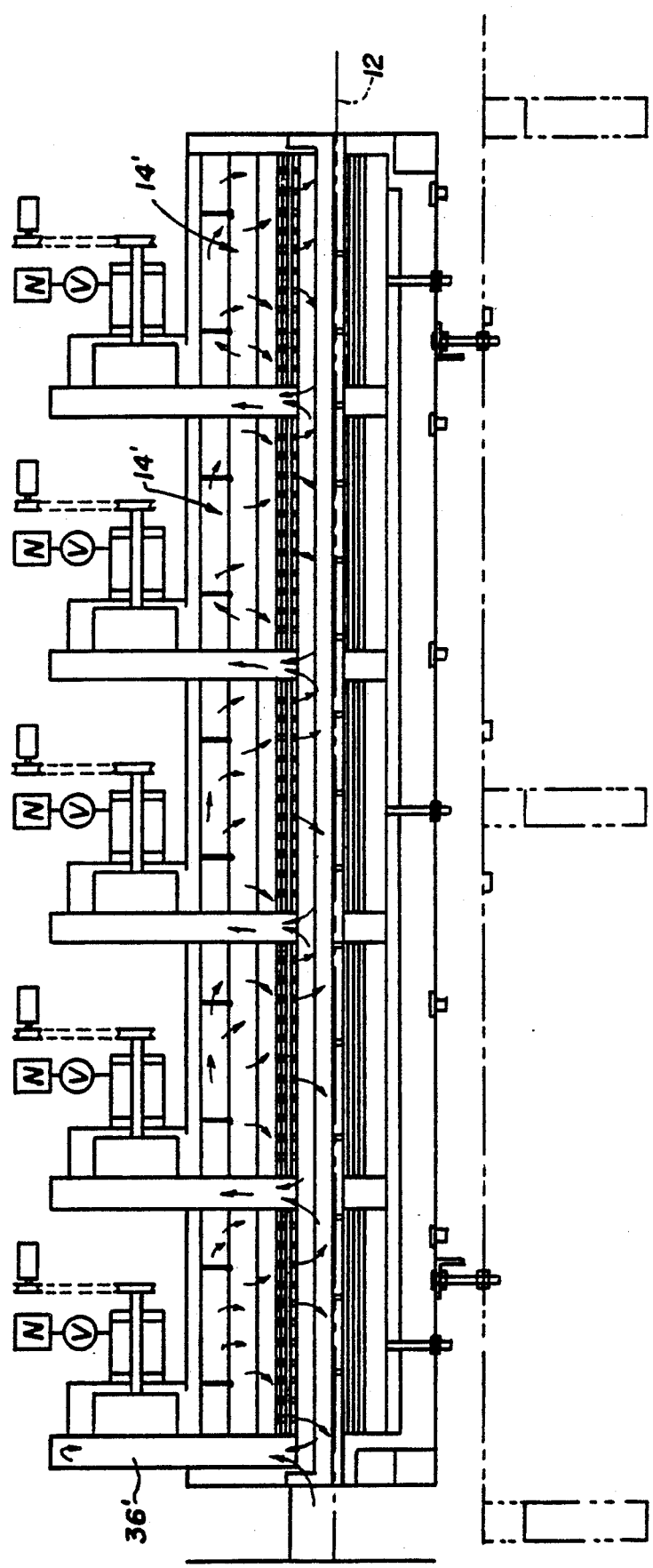

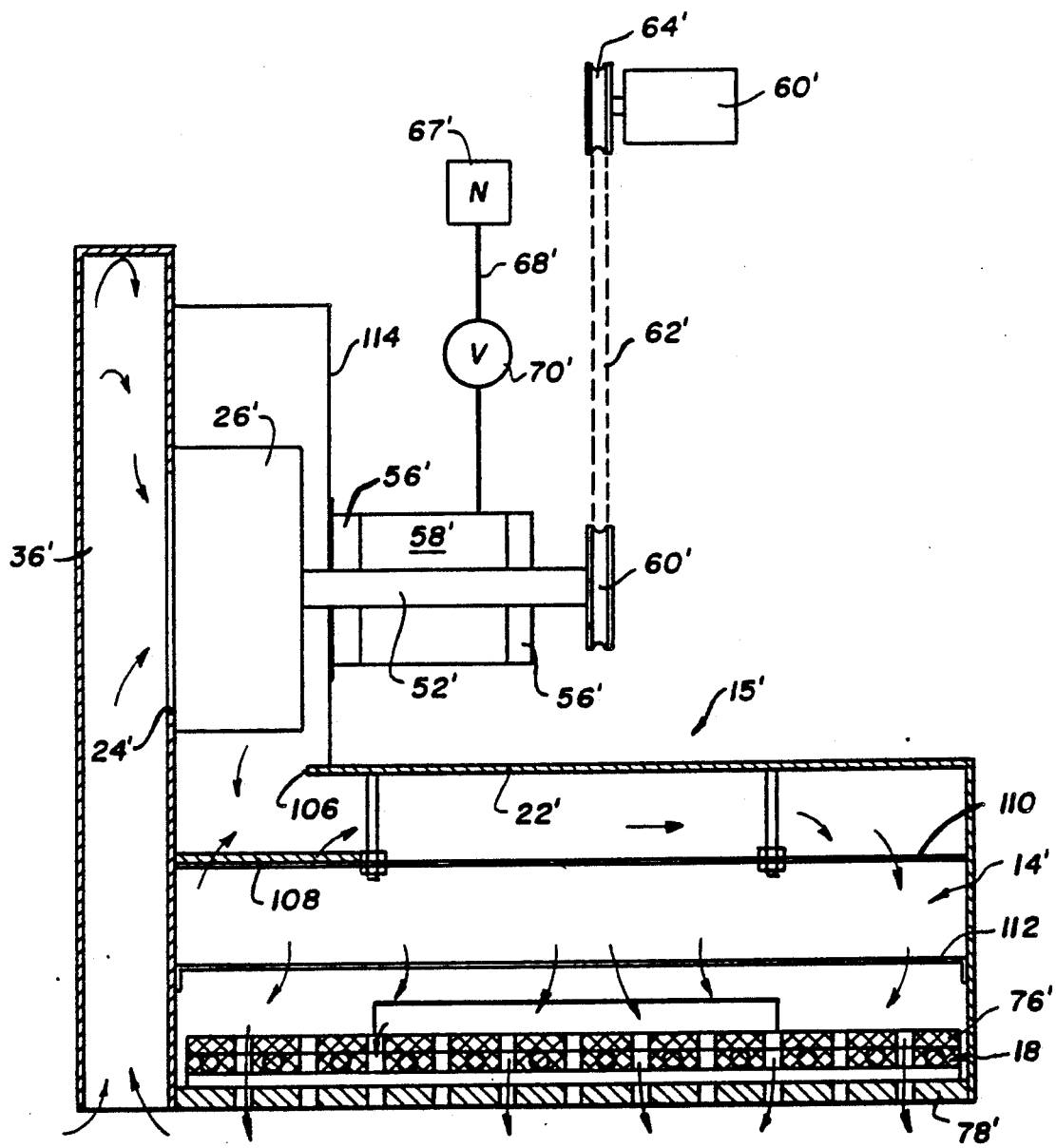

INERTED IR SOLDERING SYSTEM

BACKGROUND OF THE INVENTION

This invention relates to automatic soldering machines for soldering components on printed circuit boards.

Some PCB's do not have through holes and these are known as surface mount devices (SMD's). A preferred soldering technique for SMD's is infrared (IR) reflow in which solder paste on the PCB's is caused to reflow upon the application of heat. More particularly, heating takes place in separately controlled zones within the machine permitting precise temperature profiling. The boards pass by wire mesh conveyor first into a preheat zone which gently heats the solder paste to drive off volatile solvents and avoid thermal shock to the PCB; s. After preheating, the PCB's pass into the main heating zones where they are raised to reflow temperature. On exiting from the heating zones the boards are cooled, typically by blowing air up through the conveyor mesh, to solidify the solder joints.

In a development of this technique, automatic soldering machines have been designed in which the IR heating is supplemented with force convection. In one such machine marketed by the assignee of the present application, blowers are provided above a top row heaters which are perforated so that hot air is blown on to the PCB's.

So as to reduce or eliminate problems caused by oxidation of the solder paste it has been proposed that, instead of air, an inert gas such as nitrogen should be used for the atmosphere inside the heating zones and that forced convection would involve blowing the inert gas rather than air.

SUMMARY OF THE INVENTION

It is an object of the present invention to provide a forced convection soldering machine of this type in which the problem of air being sucked into the machine where the fan shaft enters the heating chamber is avoided or reduced. This is achieved by providing a sealed housing around the fan shaft and filling the housing with an inert gas, preferably the same as in the heating chamber, to a pressure greater than the pressure in the heating chamber.

It is another object of the invention to avoid the problem of heat from the soldering machine adversely affecting the fan motor and thereby shortening its life. This is achieved by locating the motor remote from the heating chamber and interconnecting the motor output shaft with the fan by means of a drive belt, gearing or the like.

It is another object of the invention to provide an improved heater-gas distribution chamber for an infrared furnace.

It is yet another object of the invention to provide an improved inert gas diffuser arrangement in an infrared furnace.

BRIEF DESCRIPTION OF THE DRAWINGS

FIG. 4 is a sectional view of one type of heater panel that can be used in the machine of FIG. 1.

FIG. 5 is a sectional view of another type of heater panel that can be used in the machine of FIG. 1.

FIG. 6 is a top plan view, looking in the direction of arrow A in FIG. 5, and showing a part of the heater panel of FIG. 5.

FIG. 7 is a bottom plan view, looking in the direction of arrow B in FIG. 5 and showing another part of the heater panel of FIG. 5.

FIG. 11 is a schematic view showing in longitudinal section another embodiment of IR reflow soldering machine embodying the invention.

FIG. 12 is an enlarged view of a portion of FIG. 11.

DESCRIPTION OF THE PREFERRED EMBODIMENTS

Figure 1:
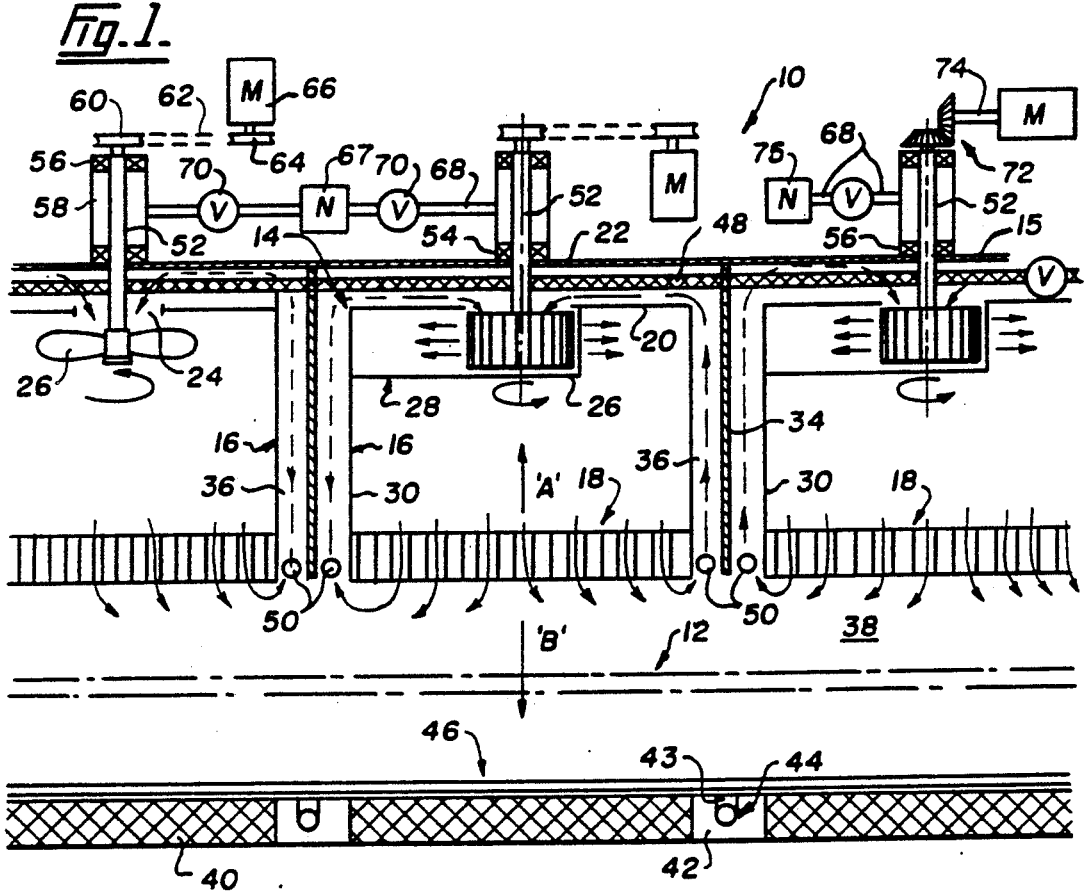
FIG. 1 is a schematic view showing in longitudinal section part of an IR reflow soldering machine embodying the invention.

With reference to FIG. 1, an IR soldering machine 10 according to the invention includes a wire mesh conveyor 12 for carrying printed circuit boards (not shown) of the SMD type from left to right through a series of heater zones 14 enclosed within a sheet metal housing 15.

The major part of each heating zone 14 is constructed as an individual module which is arranged to be controlled independently of the other modules. Each module comprises a generally box-shaped sheet metal housing 16 having a lower end closed by an apertured heater panel 18 and an upper end 20 which is spaced from the roof 22 of the housing 15. An aperture 24 is provided centrally in the upper end 20 and serves as an inlet port to a fan 26 which is suspended inside the housing 16 adjacent aperture 24. The fan may be a propeller type as shown in the left hand module or may be a fluted type as shown in the other two modules, this being the preferred form. To control turbulence in the fluted type a curved depending skirt 28 is provided.

The sides 30 of housing 16 are spaced from the sides 32 of housing 15 and from vertically disposed separator plates 34 which are located between successive pairs of modules. The spaces thus formed serve as channels 36 for circulation of gas to the inlet port 24 of the fan from the area of the conveyor 12. The channels 36 need not be rectangular in section and, indeed, circulation of the gas may be improved by contouring the channels. Furthermore, the gas channel 36 need not be provided on all four sides of housing 16. For example, the channel could be provided only at the front and rear (right and left in FIG. 1) of each module.

All of the apertured heater panels 18 are aligned in the same plane and define the roof of a tunnel 38 through which the conveyor 12 passes. The floor of the tunnel is defined by non-apertured coplanar heater panels 40 each of which is aligned with a respective module and completes a heating zone 14. Between each successive pair of heater panels 40 is a spacer 42 which has a transverse slot 43 receiving a transverse diffuser pipe 44 connected to two spaced longitudinal diffuser pipes 46 running along the floor of the tunnel adjacent opposite edges of the heater panels 40. The longitudinal diffuser pipes 46 are connected to a source (not shown) of inert gas such as nitrogen and a pump (not shown) so that an even blanket of inert gas can be pumped into the conveyor tunnel.

Running along the space between the upper end 20 of housing 16 and the roof 22 of housing 15 in the lengthwise direction of the conveyor tunnel is a pair of spaced diffuser pipes 48. These are optional and are provided to assist in the speedy purging of oxygen from the system at start up.

Also shown in the gas channels 36 adjacent the separator plates 34 and the apertured heater elements 18 are transversely disposed horizontal diffuser pipes 50. These are also optional and may be connected either to diffuser pipes 46 or 48 by means of vertical pipe sections (not shown) at each end of the horizontal pipes 50. Other configurations are also possible. The various diffuser pipes may be a sintered metal type similar to those disclosed in U.S. application Ser. No. 441,009.

The entrance (left hand side of FIG. 1) and exit (right side if FIG. 1) of the conveyor tunnel are sealed at least partially by means (not shown) such as gas curtains, mechanical doors or the like.

In operation, inert gas, which may be preheated, is pumped into the machine, the heater panels 18 and 40 are energized, the fans 26 are started and the conveyor 12 moves printed circuit boards along the tunnel. The inert gas is forced down through the apertured panels 18 and back up the gas channels 36 as indicated by the arrows, the forced convection assisting in ensuring even heating across the conveyor 12.

Each fan 26 is driven by a fan shaft 52 which is disposed vertically and passes through respective apertures 54 in the roof 22 of housing 15. Each shaft 52 is supported on two spaced bearings 56 the lower of which is adjacent the roof 22 of housing 15. A cylindrical housing 58 receives the fan shaft 52 concentrically therethrough and sealably encompasses the bearings 56 which are located at opposite ends of the housing 58. The upper end of each fan shaft 52 is provided with a pulley 60 which is connected by means of a drive belt 62 to a pulley 64 mounted on the drive shaft of an electric motor 66 mounted remotely with respect to the machine 10. A source of inert gas such as nitrogen is connected to the housings 56 via pipes 68 and pumps 70 to supply the housings 56 with inert gas at a pressure greater than that inside the housing 15.

The cylindrical housing 58 thus acts as a gas seal preventing air from leaking through the bearings and along the fan shaft 52 and inside housing 15.

Instead of a belt drive, the interconnection between the fan shaft 52 and the motor drive shaft may be achieved using bevel gears 72 and a long drive shaft 74 as seen on the right hand side of FIG. 1.

The heater panels 18 may take different forms. For example each panel 18 may take the composite form shown in FIG. 4 in which an apertured infrared heating panel 76 of the type available as Electrovert Part No. 3-0759-145-01-4 is secured in abutment to the upper face of a perforated aluminum plate 78, the holes 80 of the panel 76 registering with the holes 82 of the plate 78. Spaced above panel 76 is a perforated aluminum plate 84 which defines a chamber 86. Plate 84 has holes 88 which may be deliberately offset with respect to the holes 80 of the heating panel 76.

In use, plates 84 dampen the high velocity inert gas flow and cause it to become more uniform and the mass of the plates 84 causes the temperature in the chambers 86 to remain uniform. Chambers 86 act as pressure equalizers thereby maintaining substantially uniform convection through the heating panels 18.

FIGS. 5, 6 and 7 illustrate another form of heater panel 18 which can be used advantageously with the present invention. This comprises an insulative mat 90 encompassing electrical heating elements. The mat 90 is provided with short slots 92 spaced over the surface of the mat and extending between the two major surfaces of the mat 90. Spaced from the underside of mat 90 is an aluminum plate 94 having through apertures 96 which may or may not be aligned with the slots 94 as desired. Metal spacers 98 are provided at the extremities of the panel 18 to define the spacing between plate 94 and mat 90. The spacers may be provided at only two sides or at all four sides. Above the mat 90 a chamber 100 is provided with a port 102 adjacent the lower end of the fan.

Figure 9:
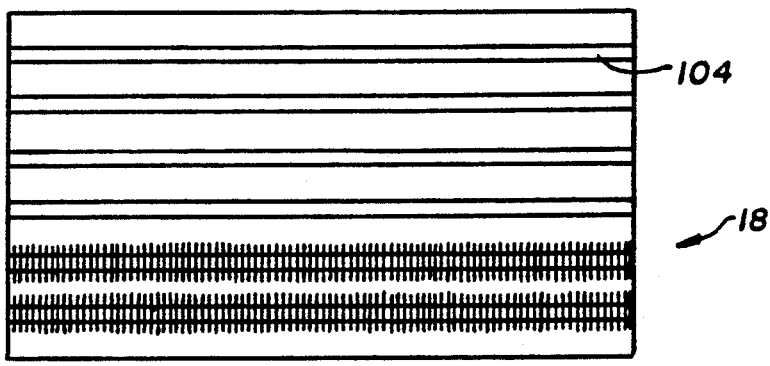
FIG. 9 is a plan view of the heater panel of FIG. 8.
Figure 8:
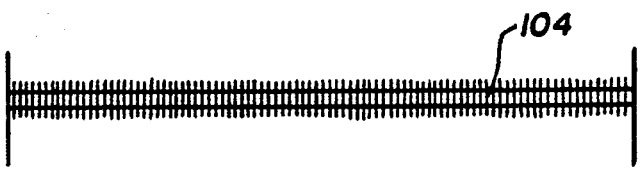
FIG. 8 is a sectional view of yet another type of heater panel that can be used.

Turning now to FIGS. 8 and 9, a further form of heater panel 18 is illustrated. This takes the form of a plurality of rod elements 104 with or without fins. The elements 104 are secured parallel to one another within a rectangular frame and the spacing between the elements determines the effective size of apertures through the panel.

Figure 10:
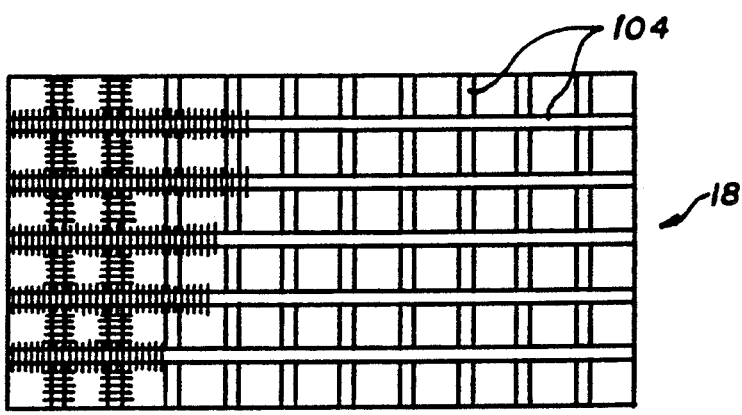
FIG. 10 is a plan view of a further type of heater panel that can be used in the invention.

In FIG. 10, there is a second plurality of the rod elements 104 which run orthogonally with respect to the first plurality. Again, the spacing between the rods determines the size of the apertures.

Figure 2:
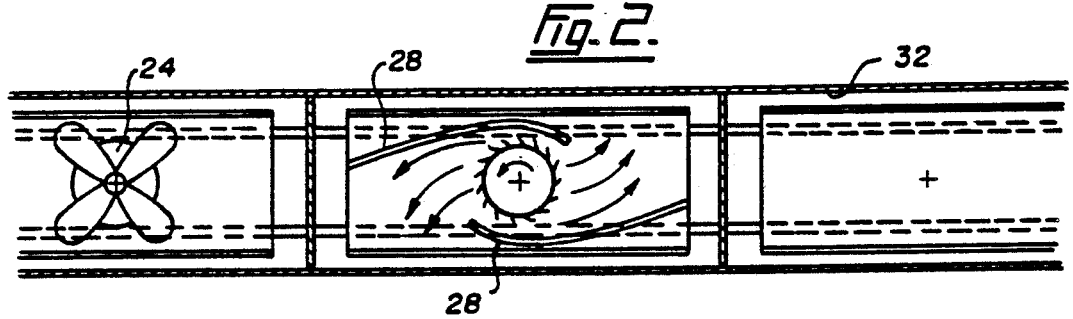
FIG. 2 is a schematic sectional view looking in the direction of arrow A in FIG. 1.
Figure 3:
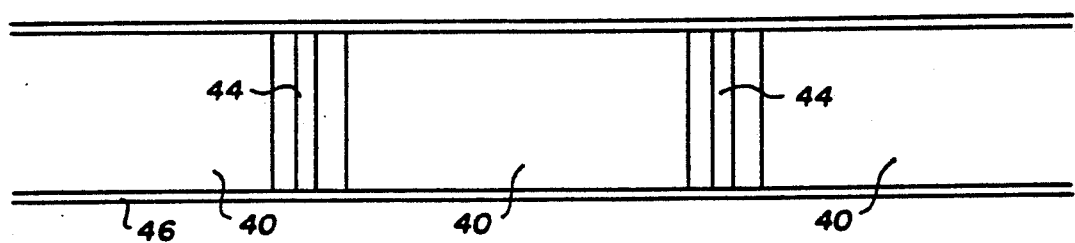
FIG. 3 is a schematic sectional view looking in the direction of arrow B in FIG. 1.

FIGS. 11 and 12 show a soldering machine similar in principle to that illustrated in FIGS. 1 to 3. However, in this case the fan shafts 52' are disposed horizontally above the respective modules 14' and do not penetrate the housing 15'. There is no exact counterpart to housing 16. Instead a single gas channel 36' is provided at one end of the module and extends upwardly above the housing 15'. As indicated by the arrows inert gas is sucked up channel 36', through the fan 26' via inlet port 24' and back out through an exit port 106 in the roof 22' of housing 15'. A deflector plate 108 redirects the inert gas towards the centre of the module. Two vertically spaced perforated sheets 110, 112 extend across the housing 15' and an infrared heater panel 18' closes off the bottom of the housing. Heater panel 18' is similar in construction to the lower portion of the heater shown in FIG. 4, consisting of an infrared heating panel 76' and a perforated aluminum plate 78'.

The horizontal fan shaft 52' extends through a vertical wall 114 of housing 15' and a gas seal 58' surrounds the shaft 52' and bearings 56' as described in the embodiment of FIGS. 1–3. Also, as shown in FIGS. 1–3, a pulley 60', drive belt 62' and pulley 64' connect the fan shaft 52' to the drive shaft of a remote electric motor 66'. Finally, a source of inert gas 67' is connected through pipes 68' and pump 70' to gas seal 58'.

In an alternative embodiment, gas seal 58 may be located intermediate bearing 56' and wall 114, accordingly not located intermediate bearings 56'.

I claim:

1. A machine for reflow soldering components on printed circuit boards comprising a conveyor for the printed circuit boards, a housing through which the conveyor passes, sealing means being provided at entry and exit ends of the conveyor with respect to the housing, means for introducing an inert gas into the housing, apertured heating panels disposed in the housing above the conveyor, fan means located in the housing for forcing inert gas through the apertured heating panels onto the conveyor, the fan means having a fan shaft protruding through a wall of the housing for connection to a drive means, and a gas seal provided at the location where the fan shaft protrudes through the wall of the housing to prevent ingress of ambient air into the housing.

2. A machine according to claim 1 in which the fan shaft is rotatably mounted on two spaced bearings, the gas seal extending along the shaft between and including the two bearings.

3. A machine according to claim 1 in which the drive means is an electric motor which is remote from the fan and is interconnected to the fan shaft by transmission means.

4. A machine according to claim 3 in which the transmission means is a belt drive.

5. A machine according to claim 1 in which the gas seal is formed as a chamber through which the fan shaft extends, the chamber containing an inert gas.

6. A machine according to claim 5 in which the inert gas is at a pressure higher than the pressure inside the housing of the machine.

7. A machine according to claim 6 in which the chamber is connected to a source of inert gas by means of pipes.

8. A machine according to claim 2 in which the gas seal is formed as a chamber through which the fan shaft extends, the chamber containing an inert gas.

9. A machine according to claim 8 in which the inert gas is at a pressure higher than the pressure inside the housing of the machine.

10. A machine according to claim 9 in which the chamber is connected to a source of inert gas by means of pipes.

* * * * *